United States Patent Office 3,346,484
Patented Oct. 10, 1967

3,346,484
PROCESS FOR REMOVING ACIDIC COMPOUNDS FROM AQUEOUS SOLUTIONS
William Richard Lewis, Baton Rouge, La., assignor to Esso Research and Engineering Company, a corporation of Delaware
No Drawing. Filed May 3, 1965, Ser. No. 452,867
9 Claims. (Cl. 208—237)

ABSTRACT OF THE DISCLOSURE

A process for regenerating media which has been deactivated by contact with an acidic material which comprises mild heating in conjunction with vacuum.

This invention relates to a method for removing weakly acidic materials, such as phenols, cresols, mercaptans and hydrogen sulfide from gas mixtures, petroleum fractions and any other mixture they may be contained in. More specifically, the invention pertains to the removal of phenols and mercaptans from mixtures of hydrocarbons such as gasoline, all naphtha cuts both virgin and cracked and the like by contact with a sorbing material such as charcoal, ion exchange resins or any material that sorbs weakly acid compounds and the restoration of the exhausted sorbing material.

The problem of removing objectional odors arising from the presence of phenols and mercaptans in gasoline and other petroleum fractions is well known. Phenols can be removed by contacting with sodium hydroxide but a chemical waste disposal problem is created. The generic term used to describe the process wherein the objectional mercaptan odors are removed is sweetening. Sweetening can be accomplished by oxidation of the mercaptans to nonodorous products, usually disulfides, or by an extraction process in which the mercaptans are removed.

Perhaps the best known of all mercaptans sweetening processes is the "Doctor Sweetening Process." This has been in very wide use and requires the mixing of a distillate containing mercaptans with a solution of lead oxide dissolved in aqueous caustic soda to form sodium plumbite. Other well known sweetening processes include hypochlorite sweetening, copper chloride sweetening and lead sulfide sweetening.

Other methods have been developed for treating a variety of petroleum fractions for the removal, in contrast to mere conversion in situ to polysulfides, or mercaptans. An aqueous or alcoholic solution of alkali metal hydroxide which is usually used in conjunction with a solutizer such as the alkyl phenols or potassium isobutyrate or naphthenic acids is used to extract the mercaptans from the petroleum fraction. When the extraction solution is saturated with mercaptan that it is no longer an effective extraction agent, it is then regenerated. Two methods are widely accepted for this purpose. The solution can be regenerated by passing steam through the aqueous caustic solution and thereby steam-distilling mercaptans or the gas containing free oxygen can be passed through the foul solution in the presence of a phenolic catalyst or oxidation promoter at atmospheric pressure or in the absence of such a catalyst at super atmospheric pressure and the mercaptans converted to polysulfides and the polysulfides separated from the regenerated solution by decantation.

More recently it has been found that phenols and mercaptans can be removed from hydrocarbon mixtures such as gasoline, naphtha, kerosene and gas oil etc. by percolation through a strongly basic anion exchange resin and the sorbed mercaptans can be eluted from the ion exchange material with a large molar excess of dilute aqueous caustic solution.

In this same realm, a method has been devised for modifying an ion exchange resin so that the surface of the modified resin presents amine groups or substituted amine groups properly oriented in relation to the surface for reaction with any compound or compounds exposed thereto. The modified resin so described may be regenerated by washing with an alkali solution if it is desired to recover acidic constituents as a salt. An alternate method, which has been described, to reactivate the resin consists of steaming the resin by holding it at a temperature of about 100° to 300° F.

Other materials are well known for the removal of acidic compounds from aqueous solutions and nonionic hydrocarbons by adsorption. Aside from ion exchange resins, charcoal is a well known sorbing media which may be used for such a purpose. Other effective sorbents include attapulgus clay, fuller's earth and others.

The prior art teaches the material containing the acidic compounds such as hydrogen sulfide, thiophenes, cresols, phenols and mercaptans is contacted with activated charcoal, an ion exchange resin or any material that sorbs acidic compounds by molecular sorption. When the sorbing material has become saturated with acidic material it is regenerated. A variety of regeneration techniques have been suggested and include elution with alcohol, elution with alkali followed by water washing and elution with steam. However, these techniques have met with very limited success. The main problems have been the loss in capacity that is encountered with almost every regeneration cycle. Then too, these techniques are not economical to operate commercially.

Regeneration techniques which employ use of high temperature destroy the sorption material whether it be charcoal, a molecular sieve or an ion exchange resin. Regeneration techniques which utilize lower temperatures have not restored the sorbing material to a capacity of more than about 70% of the original sorbing capacity is possessed. The sorbing material must be desorbed in order to continue its operation but simultaneously it may not be exposed to higher temperatures since this will deactivate the sieve. Applicant has theorized that this deactivation is caused by polymerization of phenols which are present within the feed stream. Regardless of whether or not this is the case, the deactivation of the sorbing material and especially an ion exchange resin always follows the elevation of the temperature during regeneration to temperature above about 350° F.

Thus, a substantial problem exists. A sorbing material such as charcoal or a modified or nonmodified ion exchange resin to be effective must be restored to near its original capacity after being deactivated by prolonged use. However, this must be accomplished without permanently damaging the sorbing material with high temperatures. Thus, this invention requires the use of moderately elevated temperatures. Moderately elevated temperatures are those temperatures which are sufficiently high to weaken the bond between deactivating material and a sorbing material but not sufficiently high so as to deactivate the sorbing material.

According to this invention it has unexpectedly been found that permanent deactivation of a sorbing material can be prevented while the sieve is regenerated to 90 to 100% of original capacity if the temperature of the sorbing material is raised to about 100° to 300° F., preferably 200° to 300° F., and most preferably 250° to 265° F. and simultaneously with this raise in temperature the sorbing material is exposed to vacuum desorption. Desorption pressures of 10 to 300 millimeters of mercury may be utilized, preferably 10 to 200 millimeters, most preferred 20 to 150 millimeters.

More specifically, the invention discloses that vacuum desorption at moderately elevated temperatures will successfully regenerate sorbing material. A mechanism for the success of this process will be offered. However, it should be clearly understood that no invention is to be bound by any particular mechanism. It is theorized that charcoal and ion exchange resins primarily remove the acidic compounds in the range covered, by molecular sorption. Therefore, the molecular bond between the sorption material and the sorbed compounds must be broken before the sorbed acidic compounds can be completely eluted from the sorbing material. The use of heat in conjunction with an elution agent to break this molecular bond is the key to the process. During elution the temperature of the sorbing material must be raised above the normal boiling point of the sorbed material in order to break the molecular bond that exists between the sorbing material and the sorbed acidic compounds. For phenol for instance a temperature of about 100° F. above the normal phenol boiling point is recommended. It should be pointed out, that the temperature required to desorb 100% of the acidic material can vary. Consequently, the exact regeneration temperature must be determined for each batch of sorbing material. Effective removal of phenol from charcoal at 360° F. at atmospheric pressure for example would not be successful since phenol boils at about 358° F.

Temperature is critical to charcoal, ion exchange resins and other sorbing material due to the previously mentioned deactivation problem. Therefore, vacuum is used to maintain the sorbing material at as low a temperature as possible during regeneration while still effecting a successful regeneration. The moderately elevated regeneration temperatures serve to loosen the bond between deactivating contaminants such as phenol and the sieve. The vacuum then serves to break the remaining links between the deactivating contaminants and the sieve as it should be emphasized that heat alone as applied according to this invention is not sufficient to successfully reactivate w/o permanently damaging the sorbing material. Sufficient heat to accomplish this without the aid of vacuum desorption would permanently damage the sorbing material.

This invention is applicable to a great number of resins. Ion exchange resins which are either anion or cation in type may both be regenerated by this process. Numerous examples of such ion exchange resins may be enumerated. Typical resins include Zirex–1, anion resin or Dow experimental 2% divinylbenzene-styrene copolymer sulfonated cation resin which is described in Industrial and Engineering Chemistry, volume 1, No. 1, January 1962. Other resins which may be utilized for the instant invention include the strongly basic Rohm & Haas exchange material XE–75, as well as the other strongly basic anion exchange materials manufactured by the same or other manufacturers. These strongly basic anion exchange materials are capable of substantially removing weak acids such as silicic and hydrocyanic acids, phenols and the like from aqueous solution thereof. Representative of these materials are Rohm & Haas company resins IRA–400 and Dow Chemical Company resins Dowex 1 and 2. A strongly basic ion exchange resin is neutralized in the range pH 10 whereas a weakly basic ion exchange resin is neutralized in the range of pH 7 to 2. In general, a strongly basic ion exchange resin is one which antitration with hydrochloric acid and electrolite free water as a pH above about 7.0 when the amount of hydrochloric acid added is one-half that required to reach the inflection or equivalence point.

The Rohm & Haas basic resins can be adequately described as styrene copolymers chloromethylated and aminated to quaternary ammonium hydroxide materials. The Dow Chemical Company strongly basic resins are quaternary amines with styrene-divinylbenzene nuclei.

Among the cation exchange materials which may be utilized are the following: Dowex 50, Dowex 1–8% DVB Sulfonated, Resinous Products Chemical Co.; Amberlite IR–50, Duolite C–10, Chemical Process Co.

With respect to other sorbing material this invention is equally applicable to activated charcoal. Pittsburgh activated carbon type SGL or CAL are readily adaptable to this process for removing acidic constituents.

The molecular sieves manufactured by the Linde and Davidson companies are also satisfactory for removing acidic materials from any given feed stream. Of particular value are the molecular sieves having pore size openings of 4 angstroms.

The weak acids which are adsorbed by sorbing materials of these types mentioned above are compounds having ionization constants of $10^{-5}$ or lower. Preferably $10^{-6}$ or lower.

A great variety of weak acidic-containing feed streams may be purified by this process. Applicable feed streams include all cuts of naphtha. Both virgin and cracked. However, a great variety of other acidic-containing feed streams may be purified and the sorbent regenerated by the process of this invention. Included among them are hydrogen, carbon monoxide, carbon dioxide, light hydrocarbons, i.e. $C_1$ through $C_5$, water white, gas oils of low boiling ranges, and even water which contains undesired acidic constituents.

The acidic constituents which may be removed by this invention are also extremely numerous. The most important acidic materials to be removed are mercaptans, hydrogen sulfide, thiophenes, and phenols. However, there is no intention to be limited merely to these acidic constituents.

In accordance with this invention a hydrocarbon containing weakly acidic contaminants to be treated is passed over the sorption media at a temperature of from 50° to 200° F. and a pressure of from 0 to 1000 p.s.i.g. Space velocities for this invention include 1 to 50 w./w./hour and the sorption process may be continued for 0.3 to 24 hours depending upon the particular feedstock utilized as well as the sorbing material. The feedstock may be introduced in either liquid or gaseous phase.

Regeneration is that process in which undesired materials are removed from the sorbing material and the bed is restored to its original activity level or to a level which is close to the original activity level of the sorbing material. Levels of about 95 to 99+% of original capacity are obtained. Regeneration itself lasts for a period of ⅓ to 70 hours, preferably ⅓ to 48 hours, most preferred ⅓ to 40 hours. In order to regenerate, the temperature of the bed is raised to moderately elevated temperatures of from 200° to 350° F., preferably 255° to 265° F. The pressure in the treating vessel is lowered to 10 to 300 millimeters, preferably 10 to 200 millimeters. The necessary heat for the regeneration technique may be provided by direct heat exchange means, e.g. steam and/or hot gas. That is to say either steam or hot gas may be used individually or in combination with one another. Among the hot gases which may be utilized along with the vacuum desorption are air, nitrogen, carbon dioxide, hydrogen, carbon monoxide or mixtures thereof. The particular gas used is not critical and an extensive list of substitutes would be obvious to one skilled in the art, however, steam is preferred.

In a preferred embodiment of this invention the light naphtha which contains a variety of acidic materials, i.e.

phenols, cresols, mercaptans in the range of $C_1$ to $C_{50}$, $H_2S$ and thiophenes is to be treated by means of an ion exchange resin. The naphtha is passed over a Dowex–1 anion resin which serves to remove the acidic constituents especially the phenols. After a period of 20 to 1440 minutes of being exposed to the feedstock the adsorption capacity of the sieve is substantially reduced to about 20% to 90% of its original capacity. During the adsorption procedure the temperature of the sieve was 75° to 80° F., the pressure was atmospheric (760 mm.±10 mm. mercury) feedstock was fed at a rate of 0.1 to 0.3 w./w./min.

After the deactivation has occurred regeneration of the sieve begins. In order to accomplish this, the pressure surrounding the sieve is lowered to 10 to 150 millimeters of mercury and the temperature around the resin is raised to 200° to 350° F. by means of passing hot steam through the sieve zone. This process is continued for 20 to 4320 minutes and the hot steam is passed over the resin at a rate up to 12 lbs./hr./cu. ft. resin or sorption medium. At the end of this time, the resin has been restored to 99+ percent of its original capacity. It should be noted that resin now have a variety of uses as evidenced by the book by Kunin, Ion Exchange Resins (second edition 1958), pages 247 to 259. Thus, this invention would also be applicable to restoring ion exchange resin which had been utilized in a catalytic fashion.

EXAMPLE 1

In this example a naphtha cut boiling in a range of about 200° to 430° F. and containing 0.94 wt. percent phenol is percolated through a bed of anion exchange material at a liquid space velocity of about 9 w./w./hour. The ion exchange resin is Dowex–1, anion resin. For the first 20 minutes the effluent naphtha is found to contain about .005 wt. percent phenol. This analysis, as well as all others for contaminants reported herein are made by ultraviolet analysis. The percolation of this naphtha is contined for a total time of 40 minutes. At this point about .235 wt. percent phenol is found in the naphtha effluent. At this point the resinous material is operating at about 75% of capacity and it is desirous to regenerate it. Capacity in this case is defined as 100 minus the wt. percent phenol in the hydrocarbon leaving the bed divided by the wt. percent phenol in the hydrocarbon feed times 100.

The regeneration technique which is utilized is that of the instant invention. The pressure of the sieve bed is lowered to about 20 millimeters of mercury and the temperature is raised to about 260° F. The temperature is maintained there by continuously passing steam through the bed and applying external heat, if needed. This process is continued for about 120 minutes. At this time the flow of steam through the bed is stopped and the pressure is raised to the original 760 mm. of mercury and the temperature is dropped to about 100° F.

The flow of naphtha through the bed is resumed and the effluent from the bed is examined and found to contain about .005 wt. percent of phenol with the phenol breakthrough occurring at the same point as originally. This indicates that the bed has been restored to about 99+% of its initial capacity.

EXAMPLE 2

In this example conditions similar to those used for Example 1 are utilized except that the sorbing medium is Pittsburgh Activated Carbon Type SGL instead of the resin. Charcoal has about 8 to 10 times more sorption capacity than ion exchange resin of the type used and requires a longer sorption period to react a breakthrough. It is found that after the bed is vacuum desorbed and heat treated the charcoal is restored to about 99+% of its initial capacity.

Although this invention has been described in some detail it is intended to only be limited by the attached claims.

What is claimed is:

1. A method for regenerating a solid sorbing material selected from the group consisting of ion exchange resins and activated charcoal which is exhausted with weakly acidic material which comprises contacting the said sorbing material with a vacuum at moderately elevated temperatures sufficiently high to weaken the bond between deactivating material and said sorbing material without deactivating said sorbing material for sufficient time to substantially restore the sorbing material to its original capacity.

2. The process of claim 1 wherein the said acidic material is a phenol.

3. The process of claim 1 wherein the said moderately elevated temperature is 200° to 350° F. and the pressure is 10 to 300 millimeters.

4. In a process wherein a feed stream containing at least one constituent of the group consisting of mercaptans, $H_2S$, thiophene, and phenol is contacted with a solid sorbing material selected from the group consisting of ion exchange resins and activated charcoal wherein the sorbing material after sufficient contact with the said feed stream is substantially deactivated the improvement which comprises restoring the said sorbing material substantially to its original capacity by heating the sorbing material to a temperature of from about 200° to about 350° F. at a pressure of from about 10 to about 300 millimeters for a sufficient period to substantially restore the original capacity of the sorbing material.

5. The process of claim 4 wherein the said feed stream is a naphtha.

6. The process of claim 5 wherein the said acidic material is a mercaptan.

7. An improved regeneration process wherein a phenol containing naphtha feed stream is contacted with a solid sorbing material selected from the group consisting of ion exchange resins and activated charcoal for a period of 0.3 to 200 hours, at a temperature of 50° to 200° F. and ambient pressure halting the flow of feed stream over said sorbing material, raising the temperature over said sorbing material to 200° to 350° F., lowering the pressure over said sorbing material to 10 to 300 millimeters for 0.3 to 72 hours wherein the said sorbing material is substantially restored to its original capacity.

8. The process of claim 7 wherein the said temperature over the sorbing material is raised by means of passing heated steam through the said sorbing material.

9. The process of claim 7 wherein the said temperature over the said sorbing material is raised by passing hot gas through the said sorbing material.

References Cited

UNITED STATES PATENTS

| | | | |
|---|---|---|---|
| 3,024,868 | 3/1962 | Milton | 55—73 |
| 3,037,338 | 6/1962 | Thomas | 55—58 |
| 3,078,640 | 2/1963 | Milton | 55—73 |
| 3,085,379 | 4/1963 | Kiyonaga et al. | 55—58 |
| 3,284,531 | 11/1966 | Shaw et al. | 208—240 |

DELBERT E. GANTZ, *Primary Examiner.*

SAMUEL P. JONES, *Examiner.*